US011512988B1

(12) United States Patent
Cray et al.

(10) Patent No.: US 11,512,988 B1
(45) Date of Patent: Nov. 29, 2022

(54) MOUNT FOR A SENSOR

(71) Applicant: The United States of America as represented by the Secretary of the Navy, Newport, RI (US)

(72) Inventors: Benjamin A Cray, West Kingston, RI (US); Katelyn K Chagami, Newport, RI (US); Aren M Hellum, Wakefield, RI (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 17/539,312

(22) Filed: Dec. 1, 2021

(51) Int. Cl.
*G01D 11/30* (2006.01)

(52) U.S. Cl.
CPC .................... *G01D 11/30* (2013.01)

(58) Field of Classification Search
CPC ..................................... G01D 11/30
See application file for complete search history.

(56) References Cited

U.S. PATENT DOCUMENTS

| 5,392,258 | A | * | 2/1995 | Gabrielson | G01H 3/12 367/149 |
| 5,878,000 | A | * | 3/1999 | Dubois | G10K 11/006 367/188 |
| 6,370,084 | B1 | * | 4/2002 | Cray | G10K 11/006 367/176 |
| 6,697,302 | B1 | * | 2/2004 | Cray | H04R 1/44 367/176 |
| 2009/0245028 | A1 | * | 10/2009 | Donskoy | G01P 5/02 367/172 |
| 2022/0218562 | A1 | * | 7/2022 | Capelli | A61B 90/30 |

* cited by examiner

*Primary Examiner* — Jamel E Williams
(74) *Attorney, Agent, or Firm* — James M. Kasischke; Michael P. Stanley

(57) ABSTRACT

A mount for joining a sensor to a structure includes a housing shell joined to the structure and having an interior volume. First and second fluids are disposed in the housing shell. The sensor can be positioned within the housing shell at the interface between the two fluids. A secondary link can be provided to prevent vibration transmission from the structure to the housing shell. A membrane can be provided to separate the first fluid from the second fluid inside the housing shell. Guy lines can also be used to position the sensor.

18 Claims, 1 Drawing Sheet

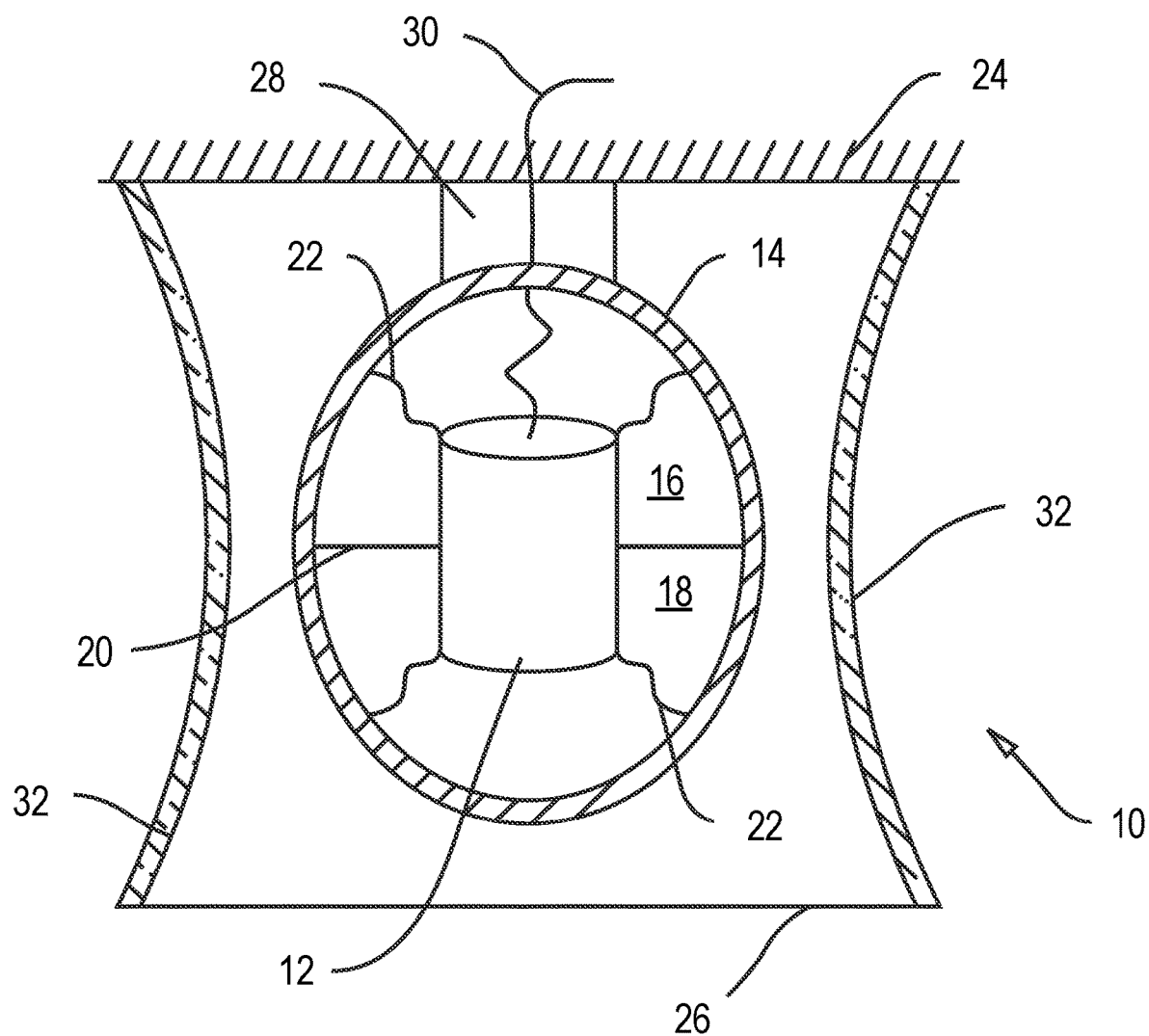

MOUNT FOR A SENSOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The invention relates to a fluid suspension mount for an acoustic vector sensor.

(2) Description of the Related Art

An acoustic vector sensor (AVS) may have an omnidirectional pressure sensor as well as three components of acoustic particle velocity to estimate the acoustic intensity. The AVS may be positioned underwater (such as in a marine environment) to estimate properties of surrounding fluid particles. Acoustic intensity is a vector quantity that represents a magnitude and direction of an active or propagating part of an acoustic field, thus indicating a direction of arrival of a received signal.

The sensing elements of the AVS may be desired to measure acoustic particle motion without significantly affecting the particle motion (such as in a fluid). However, as the AVS is mounted and contained within a mount, resistive forces may act against the particles. The resistive forces may be directly proportional to a stiffness of the mount used to suspend the AVS.

In one example, a commercially available mount including a polyethylene rope may be used to mount the AVS. The AVS's operating band may be in a range of 10 Hz to 400 Hz. The commercially available mount has a resonance frequency of ~58.5 Hz, which may interfere with operation of the AVS. Other mounting options may include suspensions configured from synthetic rubbers such as Ethylene Propylene Diene Monomer (EPDM), Nitriles, and Neoprene; however, these suspensions may be delicate in nature. Upon exposure to harsh marine environments, they are susceptible to damage from marine life damage, biofouling, and damage during deployment and recovery. Flow noise may also be transmitted to the AVS due to change in water level during tides. Therefore, the AVS should be provided with a mount that supports to the AVS while reducing any undesired resistive forces on the particles. The mount should be capable of protecting the AVS from the marine environment and reducing induced tidal flow noise.

SUMMARY OF INVENTION

A fluid suspension mount for a submerged sensor is provided. The mount includes a housing shell enclosing an upper fluid and a lower fluid with the sensor suspended vertically at an interface of the upper fluid and the lower fluid. The upper fluid and the lower fluid are immiscible. The sensor along with the mount may be submerged in an environmental fluid.

The fluid suspension mount includes a housing shell attached to a rigid structure. The housing shell may be acoustically transparent in the operating frequency range of the sensor. The housing shell is filled with two dissimilar fluids having significantly different densities. The fluids are separated by a thin membrane. The sensor is suspended vertically at an interface of the two fluids within the housing shell.

The sensor may be further restrained by flexible guy lines connecting the sensor to the housing shell. The housing shell may be surrounded by a porous fairing allowing fluidic communication between the environmental fluid and a volume of fluid surrounding the housing shell.

Suspending the sensor at the interface of two fluids having different densities allows the natural frequency of the mount to be lower than the operating frequency band of the sensor. Because of the low mount natural frequency, influence of the mount on the output of the sensor may be minimized, and sensor sensitivity may be improved.

By providing flexible guy lines to connect the sensor to the housing shell, possibility of impact of the sensor with the housing shell during transient conditions and during deployment may be reduced. Further, the porous fairing may reduce flow noise during changes in fluid level in the surrounding environment. Overall the mount may structurally support a sensor such as the AVS while isolating the sensor from very low frequency (lower than 10 Hz) vibrations, protecting the sensor from harsh marine environments, and reducing flow-induced self-noise.

BRIEF DESCRIPTION OF THE DRAWINGS

Features of illustrative embodiments may be understood from the accompanying drawings in conjunction with the description. The elements in the drawings may not be drawn to scale. Some elements and/or dimensions may be enlarged or minimized for the purpose of illustration and understanding of the disclosed embodiments wherein:

FIG. 1 is a view of a sensor supported within a fluid suspension mount.

DETAILED DESCRIPTION OF THE INVENTION

The fluid suspension mount, as shown in FIG. 1, is adapted to support a sensor such as an acoustic vector sensor (AVS) submerged in a fluid. FIG. 1 depicts a cross-section of an exemplary mount 10 used for mounting a sensor 12. The mount 10 and the sensor 12 may be submerged in a fluid (also referred herein as an environmental fluid), such as within a water body (e.g. ocean, river, lake, etc.). In one example, the sensor may be an acoustic vector sensor (AVS) configured to estimate three components of velocity and acoustic intensity of particles of the fluid in which the sensor is submerged. In other examples, any other type of acoustic sensor may be used.

The mount 10 may include a housing shell 14. The housing shell 14 may completely enclose the sensor 12 and may be formed from a rigid material. Exemplary materials may include fiber glass reinforced plastic, polyvinyl chloride, aluminum or the like. The housing shell 14 may be acoustically transparent in order to allow reception of acoustic energy by sensor 12. In this example, the housing shell 14 is shown to have an elliptical cross section; however, in alternate examples, the housing shell 14 may have a circular, a square, or a hexagonal cross-section.

The housing shell 14 may be filled with two dissimilar fluids including an upper (first) fluid 16 and a lower (second) fluid 18. Density of the upper fluid 16 may be lower than a density of the lower fluid 18. The upper fluid 16 may consist of non-polar molecules while the lower fluid 18 may consist of polar molecules, thereby naturally repelling each other.

In one example, the upper fluid 16 may be mineral oil and the lower fluid 18 may be saline having a salinity and density matching the environmental fluid. Other possible combinations of upper and lower fluids may also be used. In one example, the quantity of upper fluid 16 may be equal to the quantity of lower fluid 18 used. In one example, the quantity of upper fluid 16 may be different from the quantity of lower fluid 18 used. Sensor 12 may have a density such that the sensor 12 is buoyed by lower fluid 18 and depressed by upper fluid 16. Said another way, a first density of the upper fluid 16 may be lower than a second density of the sensor 12, and the second density of the sensor 12 may be lower than a third density of the lower fluid 18. Due to the difference in density of the upper fluid 16, the lower fluid 18, and the sensor 12, the sensor 12 may be held vertically at an interface between upper fluid 16 and lower fluid 18 within housing shell 14 substantially midway between an upper end and a lower end of the housing shell 14. By encasing the upper and lower fluids within the rigid structural housing shell 14, a hydrodynamic profile is provided which reduces shedding vortices introduced by currents in the environmental fluid.

The size of the housing shell 14 may be based on an amount of fluid (combined amount of upper fluid 16 and lower fluid 18) needed to suspend the sensor 12 vertically substantially at a center of the housing shell 14. The amount of fluid may be directly proportional to an amount of fluid displaced by the sensor 12. The size of the housing shell 14 may also be adjusted to provide tolerance for movement of the sensor 12 caused by changes in level of the environmental fluid (such as during tidal changes).

An optional membrane 20 may be placed at the interface of the upper fluid 16 and the lower fluid 18 to further separate the two fluids. The membrane 20 may be attached to the housing shell 14 and to the sides of the sensor 12. The membrane 20 may include an opening to accommodate the sensor 12. The membrane 20 may be made from a thin, lightweight material such as a cellulose film, plastic film, or metallic foil. Membrane 20 may be sufficiently resilient to allow movement of sensor 12 in all directions.

The sensor 12 may be further restrained by one or more guy lines 22 connecting the sensor 12 and housing shell 14. In this example, four guy lines 22 are shown, while other embodiments may include any number of guy lines. During ordinary operating conditions (low physical shock on the mount 10), guy lines 22 may be slack and not restrict free movement of sensor 12. When housing shell 14 is subjected to extreme physical shock, guy lines 22 may restrain sensor 12 from impacting housing shell 14. Therefore, guy lines 22 may be constructed from a relatively inelastic material such as an aramid fiber like Kevlar™.

A secondary link 28 may connect the housing shell 14 to a wall 24 of a rigid mounting structure. The secondary link 28 may be configured to resist vibrations from being transmitted from the rigid structure to the housing shell 14. In one example, the secondary link 28 may include a spring damper coupling.

The output of the sensor 12 such as an estimated acoustic energy of particles in the environmental fluid may be transmitted to a receiver via the signal connection 30. The signal connection 30 may be configured to pass through the housing shell 14 and the secondary link 28. The signal connection 30 may also be slack, allowing movement of the sensor 12. In another embodiment, the signal connection may be replaced via radio frequency communication between the sensor 12 and the control system. Electrical connections may also be made between the sensor and a power supply module via the secondary link 28. All electrical wiring should be slack to allow freedom of motion of the sensor 12.

The housing shell 14 may be enclosed by the wall 24 of the rigid mounting structure, and a porous fairing 32. The porous fairing 32 is configured from a porous (such as netted) material to allow environmental fluid to flow to an outer surface of the housing shell 14. The porous fairing 32 is attached to the wall 24 at one end. The porous fairing 32 may be pre-formed to a concave shape bulging inwards towards the housing shell 14. The porous fairing 32 may also include a bottom edge 26. The porous fairing 32 may have some flexibility but may substantially retain the concave forms. By including the porous fairing 32, noise and vibration reduction due to change in an environment (such as tidal changes) may be attained.

In this way, the system of FIG. 1 provides for a mount for a submerged acoustic sensor, the said mount comprising: a first fluid and a second fluid entrapped within a housing shell, the acoustic sensor suspended at an interface of the first fluid and the second fluid, a flexible membrane separating the first fluid from the second fluid, and one or more slack guy lines connecting the acoustic sensor to the housing shell. In this way, a noise reducing, low frequency mount may be configured for suspending the submerged sensor.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A mount for joining a sensor to a structure:
   a housing shell joined to the structure and having a volume therein defined by said housing shell;
   a first fluid disposed in said housing shell volume having a first density; and
   a second fluid disposed in said housing shell volume having a second density different from the first density wherein the sensor is positioned at an interface between said first fluid and said second fluid.

2. The apparatus in accordance with claim 1, wherein the first density is lower than the second density.

3. The apparatus in accordance with claim 2, wherein said first fluid is mineral oil, and said second fluid is saline, a salinity and a density of said second fluid is substantially same as a salinity and a density of an environmental fluid in an operating environment.

4. The apparatus in accordance with claim 2, wherein a density of the sensor is lower than the second density of the second fluid and higher than the first density of the first fluid.

5. The apparatus in accordance with claim 4, further comprising a secondary link joined between said housing shell and the structure, said secondary link configured to resist vibration transmission from the structure to said housing shell.

6. The apparatus in accordance with claim 5, further comprising a slack signal connection provided through said secondary link to the interior of said housing shell and joinable to the sensor.

7. The apparatus in accordance with claim 5, further comprising a fairing coupled to the structure and surrounding said housing shell.

8. The apparatus in accordance with claim 7, wherein said fairing is formed from a porous material configured to enable the environmental fluid to enter an area between said fairing and said housing shell.

9. The apparatus in accordance with claim 1, further comprising at least one guy line joined between said housing shell and the sensor.

10. The apparatus in accordance with claim 1, further comprising a fluid separation membrane connected to said housing shell and the sensor at an interface of said first fluid and said second fluid.

11. The apparatus in accordance with claim 1, wherein said housing shell is acoustically transparent to a frequency range of interest during operation of the sensor.

12. A mount joining an acoustic sensor to a structure, comprising:
   a housing shell having a volume therein defined by said housing shell;
   a secondary link joined between said housing shell and the structure, said secondary link configured to resist vibration transmission from the structure to said housing shell;
   a first fluid disposed in said housing shell volume having a first density;
   a second fluid disposed in said housing shell volume having a second density different from the first density wherein the sensor is positioned at an interface between said first fluid and said second fluid; and
   at least one guy line joined between said housing shell and the sensor.

13. The apparatus in accordance with claim 12, further comprising a slack signal connection provided through said secondary link to the interior volume of said housing shell and joinable to the sensor.

14. The apparatus in accordance with claim 12, wherein the first density is lower than the second density.

15. The apparatus in accordance with claim 14, wherein said first density is lower than a density of the sensor, and said second density is greater than the density of the sensor.

16. The apparatus in accordance with claim 12, further comprising a fairing positioned around said housing shell and joinable to the structure.

17. The apparatus in accordance with claim 16, wherein said faring is porous and can allow environmental fluid to flow to an outer surface of the housing shell in an operating environment.

18. The apparatus in accordance with claim 12, further comprising a fluid separation membrane connected to said housing shell and the sensor at an interface of said first fluid and said second fluid.

* * * * *